(12) United States Patent
Jain

(10) Patent No.: US 6,367,018 B1
(45) Date of Patent: *Apr. 2, 2002

(54) METHOD FOR DETECTING DEDICATED LINK BETWEEN AN END STATION AND A NETWORK DEVICE

(75) Inventor: Vipin K. Jain, Santa Clara, CA (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,462

(22) Filed: Feb. 5, 1998

(51) Int. Cl.[7] .................. G06F 13/20; G06F 15/173
(52) U.S. Cl. ............... 713/201; 709/224; 709/220; 709/318; 713/200
(58) Field of Search .................. 713/201, 202, 713/200; 710/268; 709/303, 304, 305, 217, 225, 224, 220, 318

(56) References Cited

U.S. PATENT DOCUMENTS

| 5,048,009 A | 9/1991 | Conrad ..................... 370/17 |
| 5,218,601 A | * 6/1993 | Chujo et al. ............... 370/228 |
| 5,226,120 A | 7/1993 | Brown et al. ............... 395/200 |
| 5,293,635 A | 3/1994 | Faulk, Jr. et al. ........... 395/800 |
| 5,421,024 A | 5/1995 | Faulk, Jr. et al. ........... 395/800 |
| 5,617,418 A | 4/1997 | Shirani et al. .............. 370/465 |
| 5,687,174 A | 11/1997 | Edem et al. ................. 370/446 |
| 5,721,779 A | * 2/1998 | Funk ........................... 380/23 |
| 5,815,577 A | * 9/1998 | Clark .......................... 380/52 |
| 5,864,683 A | * 1/1999 | Boebert et al. ............. 709/249 |
| 5,923,663 A | * 7/1999 | Bontemps et al. .......... 370/445 |
| 5,944,794 A | * 8/1999 | Okamoto et al. ........... 709/225 |

\* cited by examiner

*Primary Examiner*—Ayaz Sheikh
*Assistant Examiner*—Firmin Backer
(74) *Attorney, Agent, or Firm*—McDonnell Boehnen Hulbert & Berghoff

(57) ABSTRACT

A dedicated link between the intermediate system or other network device and the end system is detected prior to exchanging the authentication/identification information of the user, thereby ensuring that the information is seen only by the network device and the end system and by no one else. The method determines whether a network device has a direct connection to an end station using a test of a physical layer link active signaling mechanism. The method includes sending a message via the network from the network device to the end station indicating initiation of a test of the physical layer link active signaling mechanism. The network device then determines whether the end station participates in the test prior to proceeding with the authentication/identification processes.

1 Claim, 5 Drawing Sheets

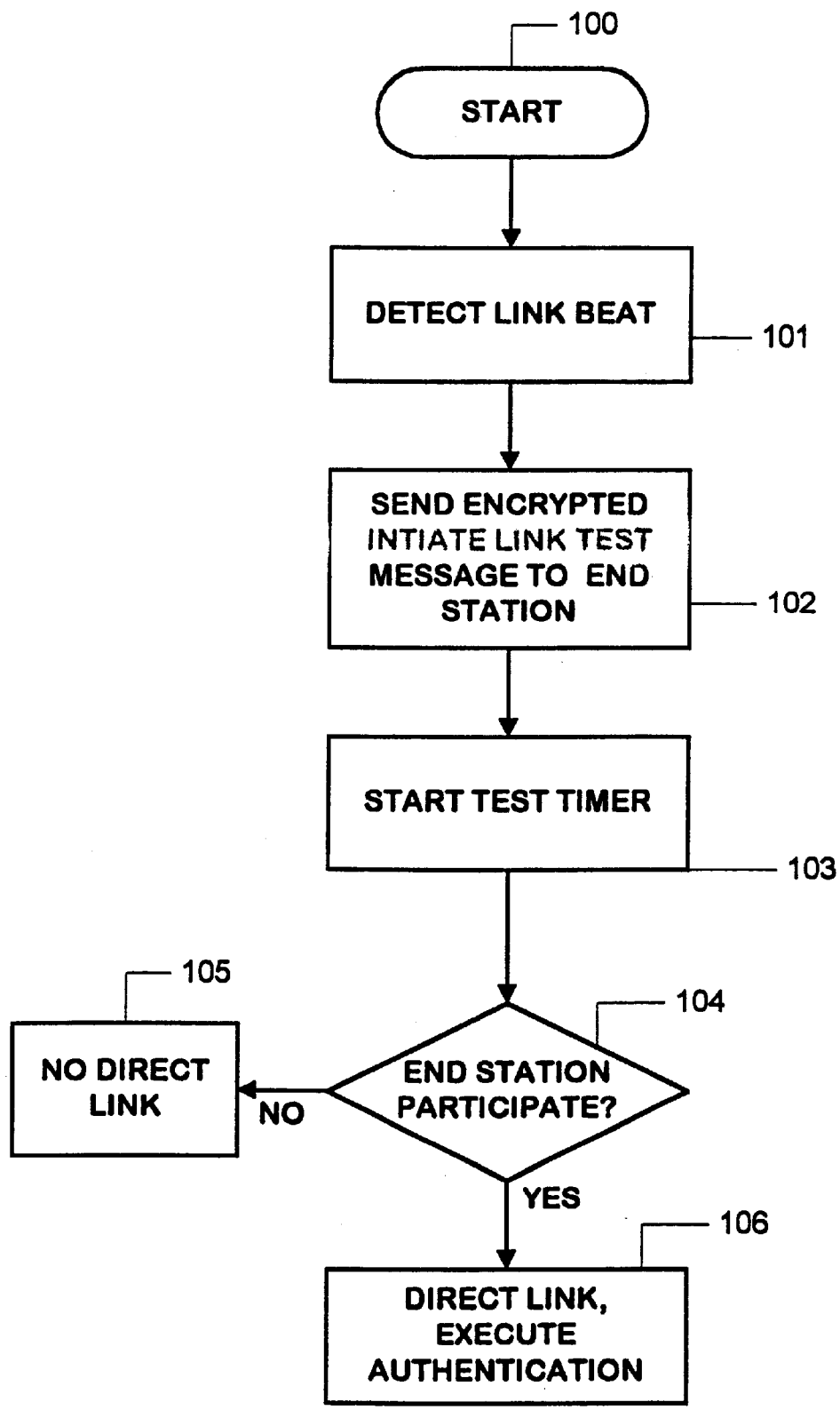

METHOD FOR DETECTING DEDICATED LINK BETWEEN AN END STATION AND A NETWORK DEVICE

CROSS REFERENCE TO RELATED APPLICATIONS

This application is related to U.S. patent application Ser. No. 09/019,461, entitled METHOD FOR DETERMINING WHETHER TWO PIECES OF NETWORK EQUIPMENT ARE DIRECTLY CONNECTED, filed Feb. 5, 1998.

BACKGROUND OF THE INVENTION

1. Field of the Invention

The present invention relates to the field of network security, and more particularly to processes for determining whether two communicating network drivers are directly connected across a physical link.

2. Background of the Invention

Security in networks is becoming an increasingly important issue. Thus, more complete authentication and identification protocols are being developed, by which end users are required to authenticate themselves or identify themselves prior to being granted access to the network. Thus, network intermediate devices have been developed which have per port authentication processes, by which whenever an end station is connected to a port on the network device, the end station or the user of the end station is required to establish that it is authorized to access the balance of the network. See for example co-assigned, co-pending United States patent applications entitled METHOD AND APPARATUS FOR PROVIDING SECURITY IN A STAR NETWORK CONNECTION USING PUBLIC KEY CRYPTOGRAPHY invented by Vipin Kumar Jain, Danny M. Nessett and William Paul Sherer, filed Oct. 28, 1997, having application Ser. No. 08/955,869; and METHOD AND APPARATUS FOR PROVIDING SECURITY IN A STAR OR HUB NETWORK CONNECTION invented by Vipin Kumar Jain, Danny M. Nessett and William Paul Sherer, filed May 30, 1997, having application Ser. No. 08/866,818. According to these prior applications, whenever a network device detects an end station or other device connected to its port, an authentication routine is executed. The presence of an end station or other device is detected by monitoring the link beat or link active signaling mechanism of the physical layer of the network link being utilized. Upon detecting the presence of a system on a port, the network intermediate device is enabled to authenticate a user on the port prior to allowing it access to the balance of the network.

One problem with prior art authentication routines arises from the fact that networks are modular and the configuration of the networks cannot be known with certainty in advance of connecting a link to a network device having the authentication capabilities. Thus, if a repeater is coupled to the port of a network device, the network device may detect a link beat on its port and then execute an authentication routine to that port. However, the repeater will broadcast the authentication information to all devices to which it is coupled, and potentially throughout a wide area network. This will allow unauthorized users of the network to monitor the authentication processes and information used in the processes. With access to the processes and information, it can be possible to break the authentication code and gain unauthorized access to the network.

Accordingly, it is desirable in some secure environments to prevent the broadcast of the authentication or identification information beyond the network device and the end station to which they relate.

SUMMARY OF THE DISCLOSURE

In one embodiment, the present invention provides for detection of a dedicated link between the intermediate system or other network device and the end system prior to exchanging authentication/identification information such as passwords, identifications, encryption information, commands or other security information in packets on the network, thereby ensuring that the information is seen only by the network device and the end system and by no one else. Embodiments of the invention provide a method for determining whether a network device has a direct connection to an end station across a link having a physical layer link active signaling mechanism or other physical layer signaling mechanism. The method includes sending a message via the network from the network device to the end station indicating initiation of a test of the physical layer link active signaling mechanism. The network device then attempts to detect participation by the end station in the test prior to proceeding with the authentication/identification processes, or other security process. One link active signaling mechanism is known as link beat signaling. A link beat is a series of link pulses that are sent continuously on a twisted pair system, in the absence of data traffic to verify productivity between an intermediate network device and an end system, as in the 10BaseT and 100BaseTX standards.

According to one aspect of the invention, the test of the physical layer link active signaling includes dropping the link active signaling at the network device and waiting for a period of time for a reply message from the end station indicating that the end station detected the loss of the link active signaling. If no reply message is received, or a reply of another type indicating that loss of the link active signaling has not been detected, is received, in the period, then the dropping and waiting process is repeated until a response is received or retry limit is reached. If the reply message is received in the period, then it is determined that the end station is directly connected.

According to another alternative, the test involves dropping the link active signaling at the end station, and monitoring the link at the network device for loss of the link active signaling from the end station. If loss of the link active signaling is detected, then it is determined that the end station is directly connected. If loss of the link active signaling is not detected, then it is determined that there may be another device on the link. Optionally, the network device retries initiating the test, until a participation is detected, or a retry limit is reached.

According to another aspect of the invention, the message used for initiating the test of the link active signaling mechanism includes an authentication element, such as encrypted data and/or a digital signature. Thus, only end stations which are capable of decrypting the message or authenticating the signature will respond appropriately.

Also, according to one option, when the process involves dropping the link active signaling at the network device, the reply message is encrypted, or provided with a digital signature, by the end station. Thus, the network device is capable of verifying the authenticity of the reply message.

One embodiment includes a method for authenticating an end station connected to a network device. The process involves sending an encrypted message via the network from the network device to the end station indicating initiation of a test of the physical layer link active signaling mechanism. Next, it is determined at the network device whether the end station participated in the test. If the end station participated in the test, then the network device executes an authentication or identification protocol at layer two (data link layer) or higher. The test of the physical layer link active signaling can take the form discussed above.

From the point of view of the end station, one embodiment includes receiving via the network from the network device the message that indicates initiation of a test of the physical layer link active signaling, and participating in the test. The step of participating, according to the alternative where the link active signaling is dropped at the network device, includes monitoring the link at the end station for loss of the link active signaling, and sending a reply to the network device if loss of the link active signaling is detected. In another alternative, the end station participates in the test by dropping the link active signaling for an interval of time, and then reactivating the link active signaling. After the end station participates in the test of the physical layer link active signaling to determine a direct connection, then it participates in an authentication algorithm to authenticate the user or the end station at a higher layer to the network device.

Accordingly, the present invention provides for detection of a dedicated link prior to execution of authentication or identification protocols in order to prevent broadcast of the authentication/identification information to unauthorized users. According to the first alternative, the network device requests the end station to pull the link beat down, and monitors the link beat thereafter. If the initiating device observes the link beat going down within some period of time, it knows that it is directly connected to the end station. The network device may optionally repeat this process a couple of times. But if the network device observes the link beat going down as expected, it believes that it has a direct connection to the end station. Otherwise, it is assumed that there is another device in between them.

According to another alternative, the network device notifies the end station that it is going to pull the link beat down and that the end station should monitor the link beat and respond with a success/failure message indicating whether it saw the link beat going down or not. If the network device doubts the validity/integrity of the response, it may require the responding device to sign the response or encrypt the response with the users private key using a public/private key cryptography. The network device then verifies the response using the users public key. The network device may optionally repeat this process a couple of times. If the response contains a success message indicating that the responding end station observed the link beat going down, the network device believes that it is directly connected to the end station. Otherwise, there may be some device in between.

Thus, a technique is provided by which enhanced network security is achieved by establishing direct connection between communicating devices prior to the exchanging of authentication/identification or other security information.

Other aspects and advantages of the present invention can be seen upon review of the figures, the detailed description and the claims which follow.

BRIEF DESCRIPTION OF THE FIGURES

FIG. 4 is a flow chart of the direct link detection protocol of one embodiment.

DETAILED DESCRIPTION

Figure 1:
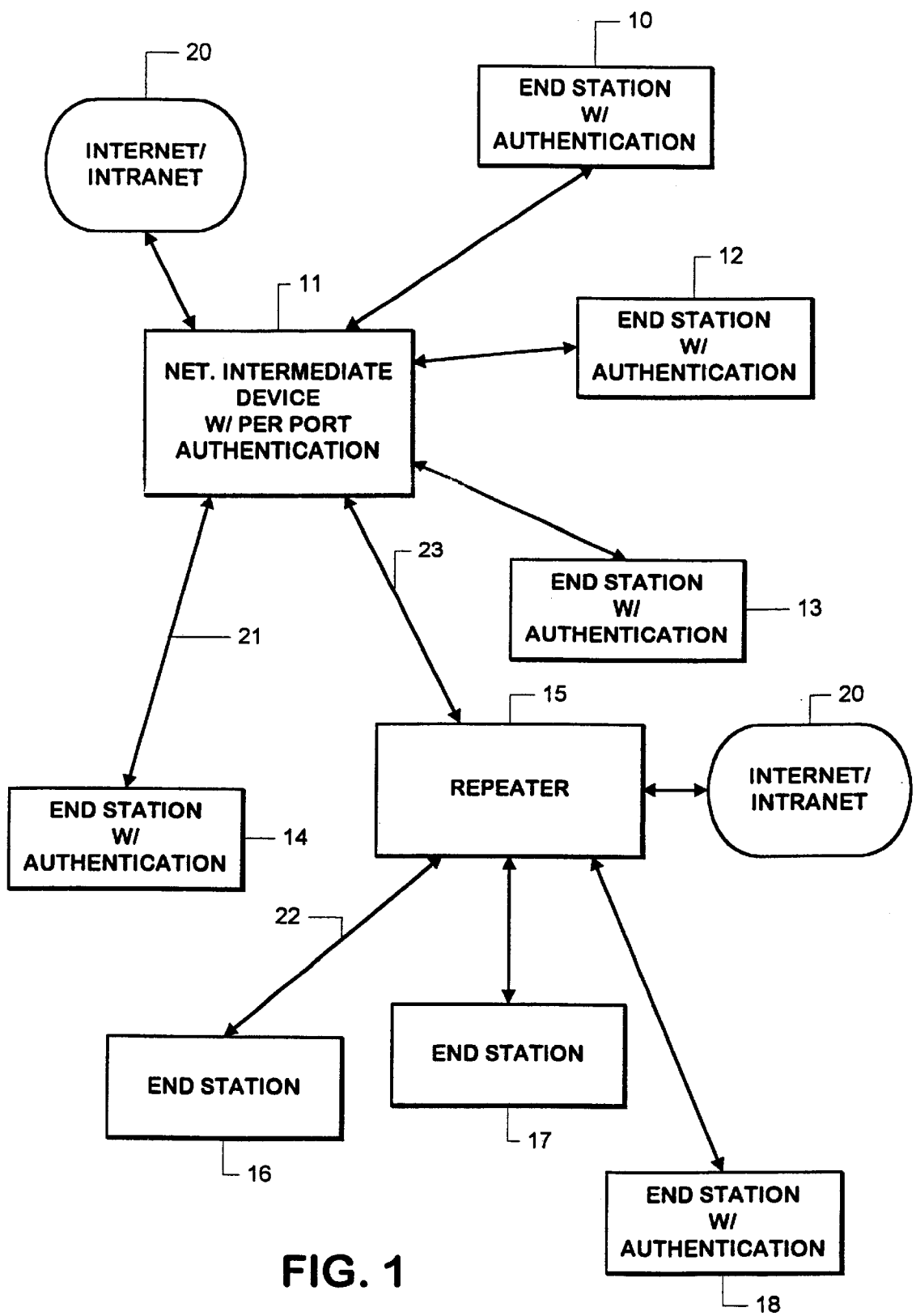
FIG. 1 is a simplified diagram of a network including the authentication and direct link detection of one embodiment.

A detailed description of the present invention is provided with respect to the figures, in which FIG. 1 provides a diagram of a data network in which embodiments of the invention may be. The data network includes a network intermediate device 11, which includes authentication resources including the direct link detection routine of the embodiments present invention. The network intermediate device 11 is connected to the Internet or an Intranet as indicated by cloud 20. Also, the network intermediate device 11 is connected to end station 10, end station 12, end station 13, end station 14, and to a repeater 15. The end stations 10, 12, 13 and 14 include the authentication routine with a direct link detection of the present invention for this example. The repeater 15 is also connected to end station 16, end station 17, and end station 18. Also the repeater is coupled to the Internet or an Intranet 20. In this example, the end station 18 includes the authentication routines of the present invention with the direct link detection.

The present invention can be understood by considering the need of an intermediate device to authenticate users of the network. Thus, the drivers running in the end station 14 and in the network intermediate device 11 communicate with one another across the link 21 to authenticate the users at the medium access control MAC layer, in another part of the data link layer or at higher layers. One technique of authentication at the driver level that is, at the network layer of the OSI network model or higher, is described in co-assigned U.S. Patent Application entitled METHOD AND APPARATUS FOR PROVIDING SECURITY IN A STAR NETWORK CONNECTION USING PUBLIC KEY CRYPTOGRAPHY, cited above, which is hereby incorporated by reference as if fully set forth herein.

In the situation of end station 14 providing authentication to the network intermediate device 11, the broadcast of the authentication information can be prevented by the network device. However, when the network device 11 attempts to authenticate the end station 18, it is possible that the repeater 15 will broadcast the authentication information to the Internet 20 and to the end stations 16 and 17. Thus, anyone having access to the Internet 20 or to the end stations 16, 17 might utilize the authorization information to break the authentication process and gain unauthorized access to the balance of the network.

Figure 2:
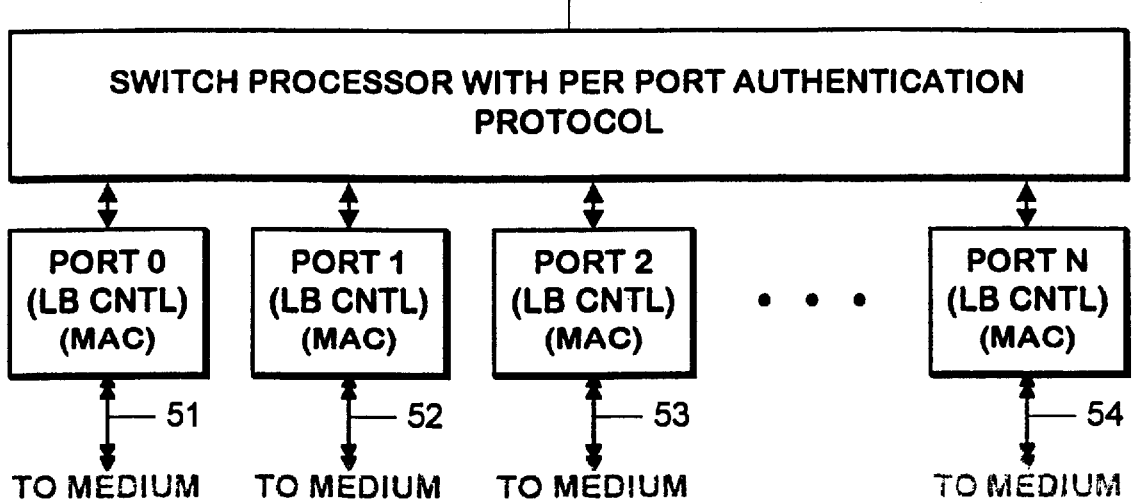
FIG. 2 is a simplified diagram of a network intermediate device including the authentication and link detect protocol of one embodiment.
Figure 3:
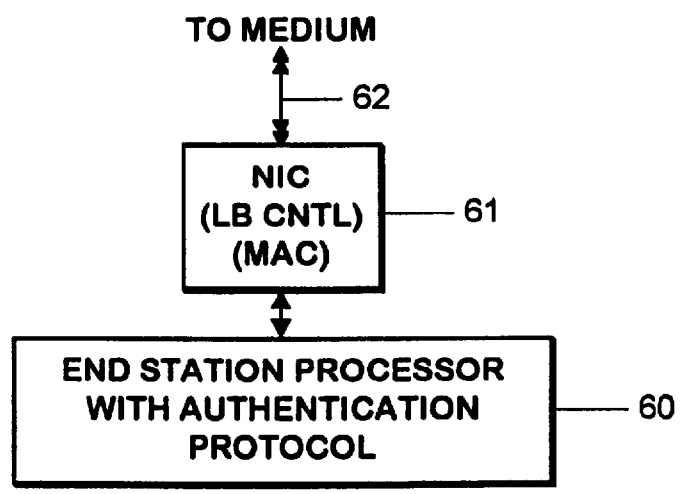
FIG. 3 is a simplified diagram of an end station having the authentication and link detect protocol of one embodiment.

FIGS. 2 and 3 provide simplified diagrams of the network devices which operate according to the auto configuration protocol of the present invention. In FIG. 2, a network intermediate device is illustrated which includes a plurality of ports, port O through port N, that provide for interconnection of end stations and links in a network. In this example, a switch is illustrated which includes a switch processor 50, which includes a driver that includes the link detect protocol of the present invention which cooperates with higher layer authentication processes as discussed above. The driver manages communication across the plurality of ports, port O-port N, onto respective network media 51–54 in the drawing.

Each port in the network intermediate device of FIG. 2 includes a link beat control circuit and a medium access control (MAC) unit. The link beat control circuit manages a physical layer link active signaling technique by which interconnected devices can determine whether a device coupled to the link is active. Thus for example in 10BaseT or 100BaseTX Ethernet, link beat pulses are generated to indicate an active link.

FIG. 3 illustrates an end station which includes a driver supporting the link detect protocol and authentication protocol of the present invention. Thus, the end station of FIG. 3 includes an end station processor 60 and a network interface card 61 that comprises a network adapter having a link beat control circuit and a medium access control MAC unit. The network interface card 61 is coupled to a communication medium 62, having on the opposite end a connection to a network device.

FIG. 4 provides a simplified flow chart of the process of authentication according to the present invention. The process starts as indicated at block 100. The first step in the process is to detect the link beat on the link connected to the port of the network device. The network device then sends an encrypted initiate link test message to the end station across the link (block 102). After sending the message, the network device starts a test timer (step 103). Then the network device attempts to detect participation by the end station in the physical layer test of the link active mechanism (step 104). If participation of the end station is not detected, then it is determined that there is no direct link (block 105). If the end station does participate properly and the participation is detected, then it is decided that there is a direct link between the network device and the end station, and an authentication routine is executed (step 106).

Figure 5A:
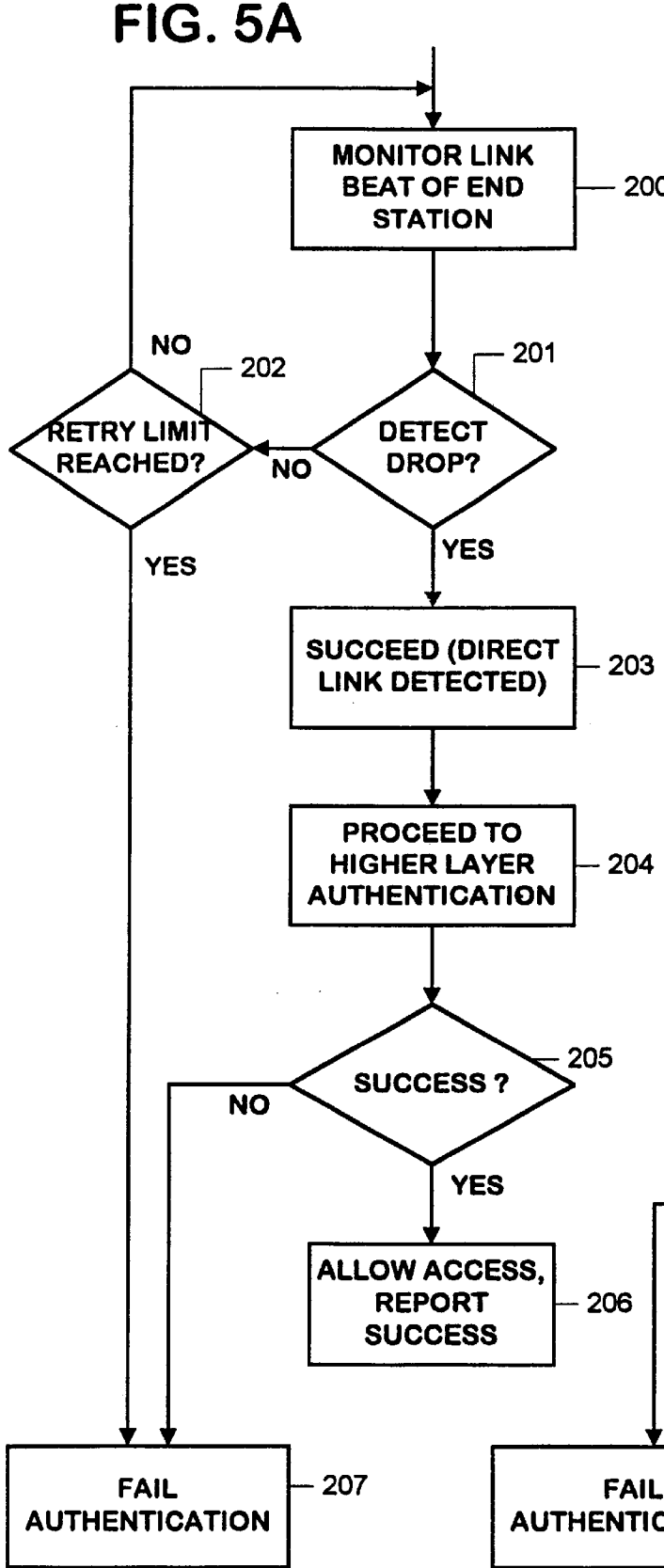
FIGS. 5A and 5B are flow charts of one example authentication test of one embodiment.
Figure 5B:
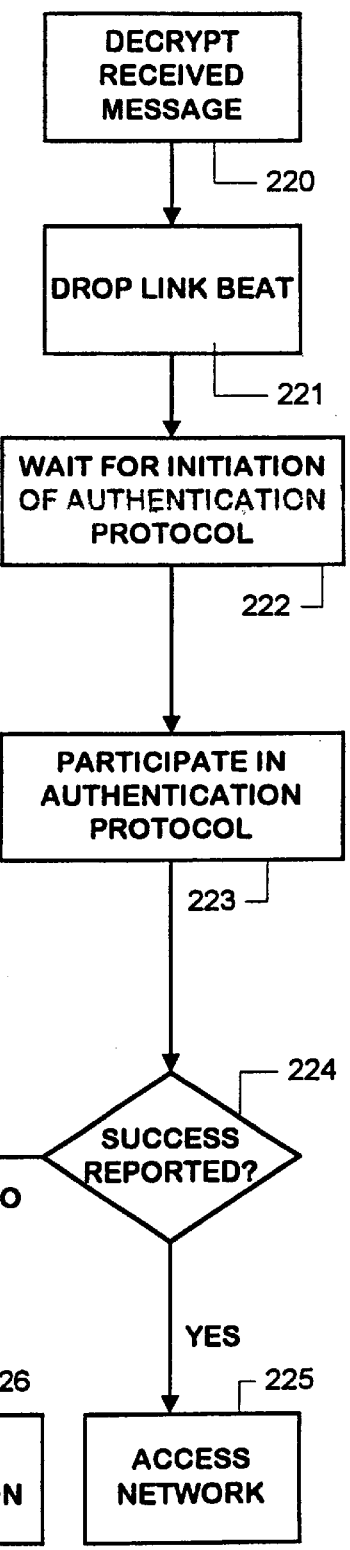
Figure 6A:
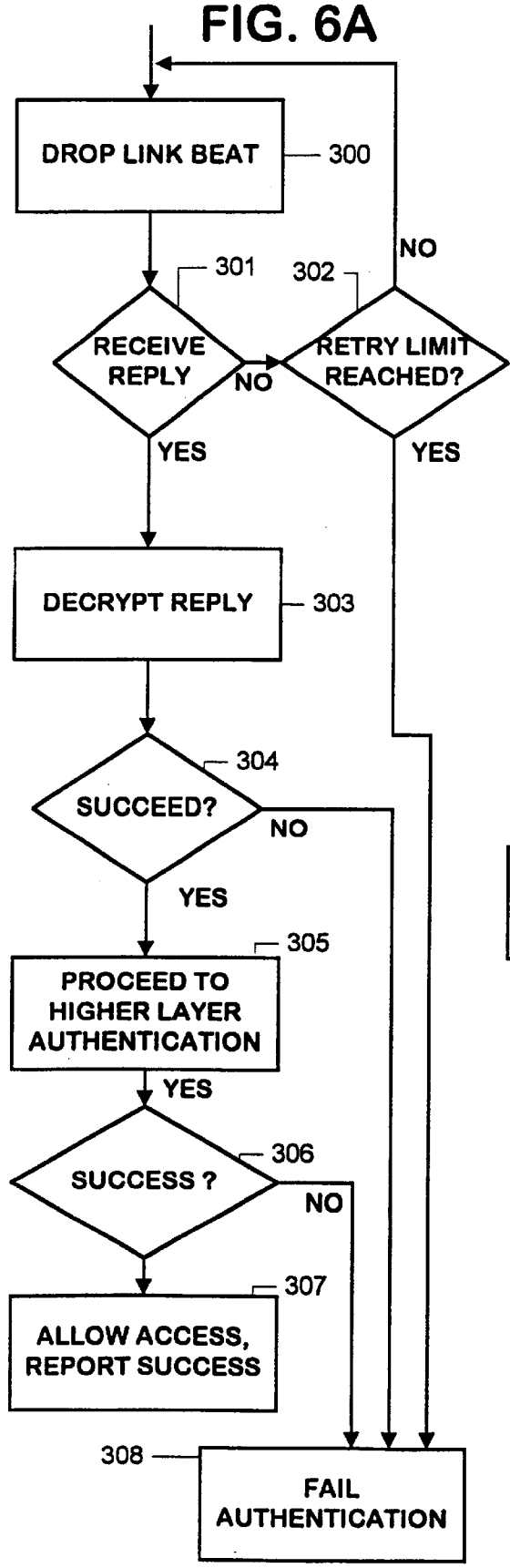
FIGS. 6A and 6B are flow charts of another example authentication test of one embodiment.
Figure 6B:
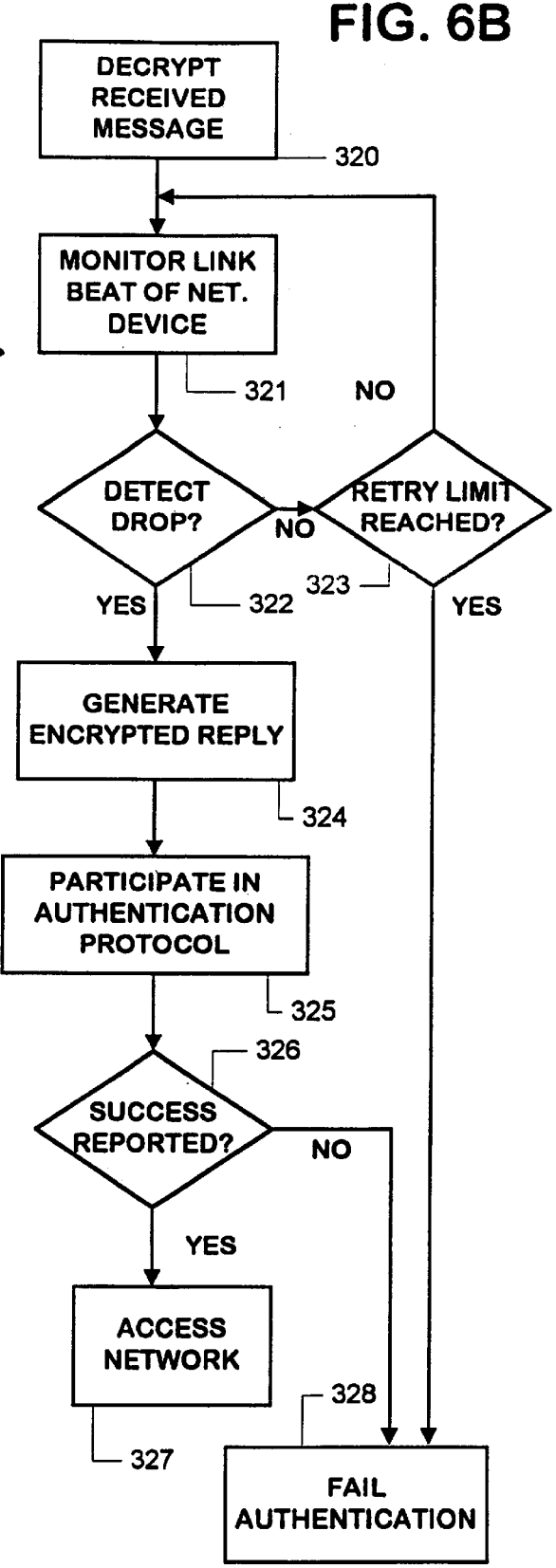

The test of the physical layer link active mechanisms can take a variety of formats. FIGS. 5A and 5B illustrate the first example and FIGS. 6A and 6B illustrate a second example. The example shown in FIGS. 5A and 5B involves dropping of the link beat signaling by the end station in response to the initiate test message sent by the network device. The algorithm executed by the network device is illustrated in FIG. 5A and the algorithm executed by the end station is illustrated in FIG. 5B.

According to this process, the initiate test message instructs the end station to drop its link beat for a period of time. Thus, the network device monitors the link beat on the port connected to the end station (block 200). Meanwhile, the end station receives the initiate message and decrypts it (block 220). If it successfully decrypts the message, then it drops the link beat on the link to the network device (block 221). The network device meanwhile is monitoring the link beat and determines whether it detects the drop (block 201). If it does not detect the drop after the time out, then the algorithm tests whether a retry limit has been reached (block 202). If the retry limit is not reached, then the algorithm loops back to block 200 to continue monitoring or alternatively to block 102 of FIG. 4. If the drop is detected at block 201 indicating that the end station is participating in the test, then the network device determines that a direct link has been detected (block 203). Meanwhile, the end station waits for initiation of authentication protocol by the network device (block 222). The network device proceeds to the higher layer authentication routines (block 204). The end station participates in the authentication protocol according to its rules (block 223). The network device determines whether the authentication protocol succeeds at block 205. If it succeeds, then access by the end station is allowed and success of the authentication protocol is reported to the end station. The end station determines whether the network device reports success of the authentication protocol (block 224). If success is reported, then it proceeds to utilize the network (block 225). If success is not reported at block 224, then the authentication protocol is failed (block 226).

Similarly, if the retry limit is reached at block 202, or success of the higher layer authentication is not found at block 205, then the authentication process fails as indicated at block 207 at the network device.

FIGS. 6A and 6B illustrate another example of the authentication process of the present invention. FIG. 6A illustrates the algorithm of the network device and FIG. 6B illustrates the algorithm of an end station according to a test of the physical layer link active signaling which involves dropping of the link beat by the network device. Thus, according to this algorithm after sending the initiate test message to the end station, the network device drops the link beat signaling on the link to the end station (block 300). Meanwhile the end station decrypts the initiate test message (block 320). Upon decrypting of the message, it begins monitoring the link for loss of link beat from the network device (block 321). If the end station detects the drop in the link beat as indicated at block 322, then an encrypted reply message is generated and sent to the network device (block 324). If the drop is not detected within a time out interval, then it is determined whether a retry limit has been reached at the end station (block 323). If the retry limit is not reached, then the end station algorithm loops back to block 321 to continue monitoring the link.

Meanwhile the network device determines whether it receives a reply from the end station indicating that the end station detected the drop in the link beat within a time out interval (block 301). If the reply is not received within the time out, then the network device determines whether a retry limit is reached (block 302). If the retry limit is not reached, then the network device algorithm loops back to block 300 to drop the link beat again for a period of time. If a reply is received at block 301, then the reply is decrypted by the network device (block 303). If the decryption of the reply is successful as indicated at block 304, then the network device proceeds to higher layer authentication routines (block 305). Success is determined of the higher layer authentication routines at block 306. If success is detected, then access to the network is allowed, and the success of the protocol is reported to the end station. If at block 302, the retry limit is reached, at block 303 the decryption fails, or at block 306, the higher layer process fails, then the authentication fails at block 308.

After sending the reply at block 324, the end station participates in the authentication protocol (block 325). If success is reported as indicated at block 326, then the end station proceeds to utilized the network normally (block 327). If at block 323 the retry limit is reached, or at block 326, the success of the higher layer authentication protocol is not reported, then the authentication routine has failed at the end station (block 328).

The present invention provides a mechanism by which a network device can ensure that there is a direct connection between an end station attempting to gain authorization for access to the network served by the network device, and the network device itself. In this way, it is ensured that identification, authorization, authentication or other information shared between the network device and the end station are not broadcast to unknown or unauthorized end stations. The invention is applicable to network topologies that include link active indicators as part of their physical layer specifications, such as the link beat indicator of 10BaseT and 100BaseTX Ethernet. Furthermore, the invention is applicable to other network topologies where a physical layer signaling mechanism can be utilized to detect a link between devices.

The detection of the dedicated link between the intermediate network device and the end system prior to exchanging authentication/identification information of a user ensures that this information is seen only by the intermediate system and by no one else. Thus, network security is enhanced.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for performing at least one authentication protocol at multiple network layers for authenticating an end station coupled to a switch in a network, the apparatus comprising:

a switch, comprising,
   a first driver that executes a link detect protocol at a physical layer; and
   a plurality of ports, wherein each port comprises a first link beat control circuit and a first medium access control (MAC) unit, and wherein the first link beat control circuit manages a physical layer link active signaling process to determine whether a device coupled to a link is active; and an end station including a second driver that supports the link detect protocol and a higher layer authentication protocol, a second link beat control circuit, and a second MAC, wherein the switch communicates with the end station via a network link to execute the link detect protocol and the higher layer authentication protocol, wherein the link detect protocol comprises, the switch starting a test timer;
the switch monitoring a link beat on the network link;
the switch sending an encrypted message to the end station;
the end station decrypting the encrypted message;
the end station dropping the link beat in response to the message;
if the switch has not detected that the link beat has been dropped before the test timer expires, the switch determining whether a retry limit has been reached;
if the retry limit has not been reached, the switch resending the encrypted message;
the switch detecting that the link beat has been dropped;
the switch determining that the switch is coupled by a direct link to the end station in response to detecting that the link beat has been dropped; and
the switch initiating the higher layer authentication protocol, which comprises,
   sending at least one encrypted message to the end station at a network layer above the physical layer; and
   if the end station participates successfully in the authentication protocol, the switch granting the end station access to the network.

* * * * *